United States Patent
Chung et al.

(10) Patent No.: US 8,241,696 B2
(45) Date of Patent: Aug. 14, 2012

(54) HYDROLYZED, SPRAY DRIED, AGGLOMERATED GRAIN POWDER AND DRINKABLE FOOD PRODUCTS

(75) Inventors: Yongsoo Chung, Palatine, IL (US); John J. Smith, Hoffman Estates, IL (US); Zeinab Ali, Crystal Lake, IL (US)

(73) Assignee: The Quaker Oats Company, Chicago, IL (US)

( * ) Notice: Subject to any disclaimer, the term of this patent is extended or adjusted under 35 U.S.C. 154(b) by 864 days.

(21) Appl. No.: 12/056,598

(22) Filed: Mar. 27, 2008

(65) Prior Publication Data

US 2008/0260909 A1    Oct. 23, 2008

Related U.S. Application Data

(60) Provisional application No. 60/912,965, filed on Apr. 20, 2007.

(51) Int. Cl.
A23L 1/10 (2006.01)

(52) U.S. Cl. ........ 426/618; 426/453; 426/456; 426/464; 426/590

(58) Field of Classification Search .................. 426/618, 426/590, 453, 463, 464
See application file for complete search history.

(56) References Cited

U.S. PATENT DOCUMENTS

| | | | |
|---|---|---|---|
| 5,234,704 A | 8/1993 | Devine et al. | |
| 5,407,694 A | 4/1995 | Devine et al. | |
| 5,476,675 A | 12/1995 | Lou et al. | |
| 5,490,997 A | 2/1996 | Devine et al. | |
| 6,210,722 B1 * | 4/2001 | Wullschleger et al. | 426/94 |
| 7,754,270 B2 * | 7/2010 | Wuersch et al. | 426/590 |
| 2006/0204634 A1 | 9/2006 | Wuersch et al. | |

FOREIGN PATENT DOCUMENTS

| | | |
|---|---|---|
| EP | 0 634 106 | 1/1995 |
| EP | 0634106 | 1/1995 |
| EP | 1782699 | 5/2007 |
| FR | 2620906 | 3/1989 |

OTHER PUBLICATIONS

Grenus, K., Food Product Design: Applications: Agglomeration, Jul. 1, 2004, Weeks Publishing Co., pp. 1-4. www.foodproductdesign.com/articles/2004/07/food-product-design-applications—jul.*
PCT/US2008/060323, International Search Report and Written Opinion, dated Aug. 13, 2008.
Examiner's First Report for corresponding Australian Patent Application 2008242287 dated May 21, 2010.
Cn Office Action dated Nov. 24, 2011 received in corresponding Application No. 200880009740.4.

* cited by examiner

*Primary Examiner* — Helen F Heggestad
(74) *Attorney, Agent, or Firm* — Banner & Witcoff, Ltd.

(57) ABSTRACT

A drinkable food product comprises a liquid and a hydrolyzed, dried, agglomerated grain powder.

18 Claims, 1 Drawing Sheet

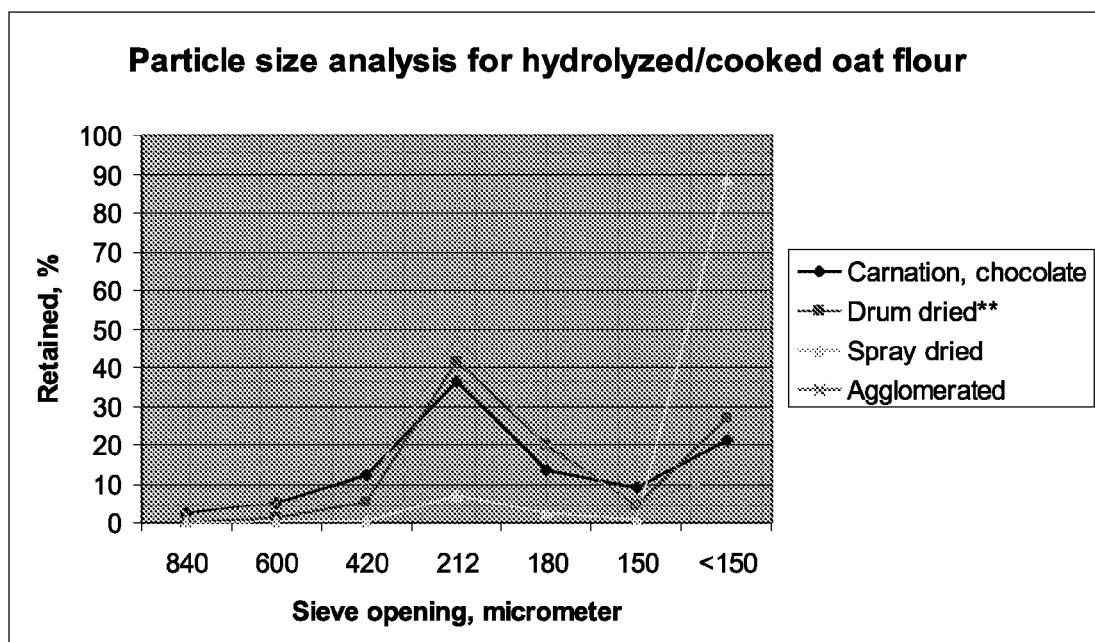

HYDROLYZED, SPRAY DRIED, AGGLOMERATED GRAIN POWDER AND DRINKABLE FOOD PRODUCTS

FIELD OF THE INVENTION

The present invention relates generally to food products. More specifically, the present invention relates to a grain powder and its uses in drinkable food products.

BACKGROUND OF THE INVENTION

Cereal food products are a staple of the human diet. Such cereal food products include, for example, oatmeal and grits. The nutritional value and health benefits of cereal food products, such as oatmeal, are well known and recognized. For example, oatmeal has been shown to reduce total cholesterol concentrations. High concentrations of cholesterol are linked to a higher likelihood of heart attacks. Reducing cholesterol levels can decrease the probability of heart diseases or heart attacks.

Thus, there is a need for increased consumption of oatmeal. Traditionally, a bowl and spoon have been required to eat hot, prepared oatmeal, preventing oatmeal from being conducive to "on-the-go" consumption. Consequently, such consumption of oatmeal can be viewed as being inconvenient. Even with the development of quick oats, oats still require cooking and typically are consumed with a spoon and bowl. Afterwards, the spoon, bowl and any utensils used for cooking the oatmeal need to be cleaned.

Attempts have been made to make drinkable or soft products (e.g. yoghurt) utilizing powdered oatmeal, for example. Typically, powder is prepared using a drum dried process from hydrolyzed/cooked oat flour. This powder is generally used in baby food and dry powder blend applications. However, such powdered oatmeal tends to clump and have poor dispersability in water or other fluids.

A need exists for an oatmeal product that has the same types of health benefits of traditional prepared oatmeal yet is convenient and easy to consume "on-the-go." A need also exists for such an oatmeal product to be convenient and not messy to consume and which has good texture and flavor characteristic.

SUMMARY OF THE INVENTION

The present invention relates to an agglomerated grain powder (e.g. oat flour) and its use in drinkable food products. It was discovered that the use of agglomerated powders provided excellent dispersability in liquids and eliminated problems of prior liquid formulations. The agglomerated powder dissolves easily without clumping and provides a smooth texture.

In yet another aspect of the invention, a process of forming drinkable food products with the agglomerated powder is disclosed.

In another aspect, the drinkable product comprises milk and an agglomerated grain powder.

In another aspect, the drinkable product comprises water, an agglomerated grain powder, and a fruit component. The fruit component may comprise fruit juice, yogurt containing fruit, fruit puree, fresh fruit, and/or a fruit preserve.

In another aspect, the drinkable food product is drinkable yoghurt containing agglomerated powder.

These and other aspects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1 shows particle size analysis for hydrolyzed/cooked oat flour.

DETAILED DESCRIPTION OF THE INVENTION

The present invention relates to drinkable food products. In particular, the present invention relates to drinkable food products prepared with hydrolyzed, dried, agglomerated grain powder. The grain may be any suitable cereal grain such as oat, wheat, corn (maize), rice, barley, millet, sorghum (milo), rye, triticale, teff, wild rice, spelt, buckwheat, amaranth, quinoa, kaniwa, cockscomb or a combination thereof.

The agglomerated powders may be prepared in any suitable manner. For example, whole oat flours can be treated with enzyme to hydrolyze starch molecules into fractions of polysaccharides. Hydrolysis may be with any suitable enzyme such as amylase. The resulting slurry can be dried in any suitable drying process, such as spray drying, to form a powder. The spray dried powder is then agglomerated to form a powder with larger particles.

Conventional spray dry process provides fine particles of powder, which cause clumps of powder when dissolved/dispersed in liquids. Generally the particles size of spray dried particles is less than 150 µm. The agglomeration process provides larger particle size of dried powder, which allows the powder to wet and disperse easily in liquid applications.

In one aspect, the average particle size of the agglomerated grain powder is from about 150 µm to about 450 µm. Generally at least 50%, at least 60%, at least 70%, at least 80%, or at least 90% of the particles should fall within the range.

The following discussion focuses on agglomerated oat flour as the agglomerated grain powder with the understanding that other suitable grains may be used.

In accordance with aspects of the invention, agglomerated oat flour is added to water. There should be enough water to make the food product drinkable. For instance, there is sufficient water to give the drinkable food a readily flowable rheology and a texture.

In an aspect of the invention, a drinkable food contains from about 5% to about 15% agglomerated oat flour and from about 70% to about 95% total water, typically about 75% to about 90% all by weight of the total drinkable food. The balance can contain sweeteners, flavors, fruits and other materials as desired.

The water should be suitable for use in food. The total water may come in part or in whole from other parts of the drinkable food, especially if milk, juices, or other water containing components are used. For instance, the milk may be dairy (e.g. whole, 2%, 1%, or non-fat) or non-dairy (e.g. soy). The milk may also be produced from powdered milk and water.

The drinkable food may also include a fruit component. The fruit component can include fruit juice, yogurt containing fruit, fruit puree; fresh fruit, fruit preserves, fruit sorbet, fruit sherbet, dried fruit powder, and combinations thereof. Typically, the fruit component has particles sufficiently small that the drinkable food component may be safely swallowed without chewing. The fruit component and/or acidulant can be adjusted to obtain a desired pH, for example a pH of less than about 4.6.

Additional ingredients may be added to the food product. Such ingredients can include non grain-based ingredients. For example, flavoring agents, coloring agents, sweeteners, salt, as well as vitamins and minerals can be included. In one embodiment of the invention, flavoring agents such as strawberry, chocolate or cinnamon flavor is added to enhance the taste of food product. Other fruit flavoring agent may also be useful to provide different tastes to the food product, for example, strawberry, mango and banana and mixtures thereof. Spices, in particular, cinnamon, can be used. In addition, any desired flavor or flavors can be used. Suitable sweeteners—artificial or natural can be added in the food product to provide a desired sweetness. For example, brown sugar, maple sugar or fruit sugar can be used. The non-grain based food component can be added in the range of about 10 to 75 wt % of the total weight of the food product.

Other optional ingredients, but are not limited to, salt, hydrocolloids, polysaccharides, thickeners, caffeine, dairy, coffee solids, tea solids, herbs, nutraceutical compounds, electrolytes, vitamins, minerals, amino acids, preservatives, alcohol, colorants, emulsifiers, and oils as known in the art.

The drinkable food typically provides at least 0.8 grams of soluble fiber per serving and at least 2.5 grams of total fiber content per serving. It is well known in the art how to vary the amounts and types of different parts of the drinkable food to achieve a desired fiber content.

The agglomerated oat flour can include beta glucan soluble fiber, such as beta-1,3-glucan, beta-1,6-glucan, or beta-1,4-glucan or mixtures thereof. In particular embodiments, the beta glucan is added, or is naturally present in the oats used to make the oat flour of the invention. In certain embodiments, the agglomerated oat flour preferably contains at least about 3% to 5% or about 3.7% to 4% beta glucan. In certain embodiments, the agglomerated oat flour containing liquid product contains 0.1% to about 1.5% beta glucan, or about 0.8% to 1.3% beta glucan. Other amounts of beta glucan are also useful.

The hydrolyzed agglomerated oat flour can be applied to various liquid products due to its reduced viscosity. The agglomerated oat flour can be used in products that are formed from a liquid such as ice cream and soft yogurt.

The agglomerated oat flour, in accordance with the invention, when dispersed in a liquid remains stably dispersed. The agglomerated oat flour should remain stably dispersed for sufficiently long duration to enable the beverage to be consumed.

As described, the present invention provides a healthy drinkable food product which is easy and quick to prepare while convenient to consume on-the-go, making it especially appealing to consumers with today's hectic lifestyle.

EXAMPLE

Benefits of the agglomerated powder include significant improvement on dispersability and solubility in liquid application.

Example 1

The following breakfast drinks were prepared. The amounts provided are dry weight. One cup (8 oz) of skim milk was added to each of the drinks prior to use.

A. Comparative—No Oat Flour

| Quaker Breakfast Drink | | |
|---|---|---|
| Ingredient | % | gram |
| Sugar | 90.09 | 10 |
| Cream flavor | 1.80 | 0.2 |
| SGVM premix | 6.76 | 0.75 |
| Textra Plus, modified starch | 1.35 | 0.15 |
| Total | 100.00 | 11.1 |

(SGVM is salt, guar gum, vitamin, mineral)

B. Inventive—Hydrolyzed Oat Flour

| Quaker Breakfast Drink Mango flavor | | |
|---|---|---|
| Ingredient | % | gram |
| Spray dried/agglomerated oat flour | 55.38 | 18 |
| Sugar | 30.77 | 10 |
| Cream flavor | 0.62 | 0.2 |
| Mango flavor | 1.23 | 0.4 |
| SGVM premix | 2.31 | 0.75 |
| Mango powder, Vanduran | 9.23 | 3 |
| Textra Plus, modified starch | 0.46 | 0.15 |
| Total | 100.00 | 32.5 |

C. Inventive—Hydrolyzed Oat Flour

| Quaker Breakfast Drink Chocolate flavor | | |
|---|---|---|
| Ingredient | % | gram |
| Spray dried/agglomerated oat flour | 56.60 | 18 |
| Sugar | 31.45 | 10 |
| Cream flavor | 0.63 | 0.2 |
| Chocolate flavor | 0.79 | 0.25 |
| SGVM premix | 2.36 | 0.75 |
| Cocoa powder, ADM | 7.70 | 2.45 |
| Textra Plus, modified starch | 0.47 | 0.15 |
| Total | 100.00 | 31.8 |

D. Comparative—Spray Dried, not Agglomerated

| Quaker Breakfast Drink Strawberry flavor | | |
|---|---|---|
| Ingredient | % | gram |
| Spray dried oat flour | 56.16 | 18 |
| Sugar | 31.20 | 10 |
| Cream flavor | 0.62 | 0.2 |
| Strawberry flavor | 0.78 | 0.25 |
| SGVM premix | 3.12 | 1 |
| Strawberry powder | 7.64 | 2.45 |
| Textra, modified starch | 0.47 | 0.15 |
| Total | 100.00 | 32.05 |

E. Comparative—Spray Dried, not Agglomerated

| Quaker Breakfast Drink Vanilla flavor | | |
|---|---|---|
| Ingredient | % | gram |
| Spray dried oat flour | 56.16 | 18 |
| Sugar | 31.20 | 10 |
| Cream flavor | 0.62 | 0.2 |
| Vanilla flavor | 0.78 | 0.25 |
| SGVM premix | 3.12 | 1 |
| Freeze dried banana powder | 7.64 | 2.45 |
| Textra, modified starch | 0.47 | 0.15 |
| Total | 100.00 | 32.05 |

Inventive—Hydrolyzed Oat Flour

| Quaker Oat Smoothie Berry flavor | | |
|---|---|---|
| Ingredient | % | gram |
| Hydrolyzed, spray dried agglomerated, oat flour | 13.03 | 20 |
| Mixed berry smoothie, Tropicana | 45.60 | 70 |
| Whey protein | 2.93 | 4.5 |
| Water | 38.44 | 59 |
| Total | 100.00 | 153.5 |

Example 2

The following breakfast drinks were prepared by the addition of one cup (8 oz) of skim milk to a powder mixture. INSTANT BREAKFAST STRAWBERRY (NESTLE CARNATION) and AVENA INSTANTENIA are commercial products. The Quaker Oat drinks were prepared in a similar manner except for the type of oat flour used.

| Breakfast drink product | Dispersability | Solubility, % |
|---|---|---|
| INSTANT BREAKFAST STRAWBERRY, NESTLE CARNATION (Comparison) | pass | 99.7 |
| Quaker oat drink, agglomerated (Inventive) | pass | 98.2 |
| Quaker oat drink, spray dried (Comparison) | fail | 84.1 |
| Quaker oat drink, drum dried (Comparison) | fail | paste** |
| AVENA INSTANTENIA, Mora (Comparison) | fail | paste** | paste** - clogged due to small mesh size

The table below provides the particle size distribution of the oat flour used in the above comparison.

| Sieve analysis on hydrolyzed oat flour | | | | | |
|---|---|---|---|---|---|
| | | % remained on sieves | | | |
| | | Commercial product | Hydrolyzed oat flour | | |
| Sieve # | Size, micron | CARNATION, chocolate | Drum dried** | Spray dried | Agglomerated |
| 20 | 840 | 2.37 | 0.1 | 0.12 | 1.84 |
| 30 | 600 | 5.01 | 1.06 | 0.36 | 4.95 |
| 40 | 420 | 12.35 | 5.41 | 0.36 | 8.73 |
| 70 | 212 | 36.42 | 41.8 | 7.03 | 48.26 |
| 80 | 180 | 13.65 | 19.97 | 2.53 | 19.16 |
| 100 | 150 | 9.04 | 4.63 | 0.84 | 4.83 |
| >100 | <150 | 21.15 | 27.04 | 88.76 | 12.23 |

**Drum dried oat flour sample - flakes were ground into small particles at 8000 rpm for 30 sec with Retsch Grindomix (model GM 200)

The agglomerated oat flour had approximately 80% of the particle size between 150-450 micrometer. Agglomerating the powder provided improved flowability of the oat flour. No oat flour was used in CARNATION drink. Its major ingredients were non fat milk, sugar, maltodextrin and lactose. AVENA INSTANTENIA contained hydrolyzed oat flour processed by drum drying process.

Example 3

The agglomerated powder provides nutritional benefits to the food product without affecting the beta-glucan % after enzyme hydrolyzation. The % of Beta glucan was measured before and after treatment by hydrolyzation, spray drying, and agglomerization.

| | Whole oat flour before enzyme treatment | Spray dried agglomerated oat flour after enzyme treatment |
|---|---|---|
| Beta glucan, % | 3.43 | 3.81 |

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A drinkable food product comprising water and about 5 wt % to about 15 wt % hydrolyzed, spray-dried, agglomerated oat powder by weight of the total drinkable food product, wherein the agglomerated oat powder has an average particle size of 150 to 450 μm; wherein at least 70% of the particles are within the range of 150 to 450 μm.

2. The drinkable food product of claim 1, further comprising one or more of salt, hydrocolloids, polysaccharides, thickeners, artificial sweeteners, natural sweeteners, caffeine, dairy, coffee solids, tea solids, herbs, nutraceutical compounds, electrolytes, vitamins, minerals, amino acids, preservatives, alcohol, colorants, emulsifiers, and oils.

3. The drinkable food product of claim 1 further comprising a fruit component selected from the group consisting of fruit juice, yogurt containing fruit, fruit puree, fresh fruit, dried fruit powder, fruit preserves and combinations thereof.

4. The drinkable food product of claim 1 wherein the product provides greater than about 0.8 grams of soluble fiber per 250 grams of drinkable food.

5. The drinkable food product of claim 1 wherein the product provides greater than about 2.5 grams of total fiber per 250 grams of drinkable food.

6. The drinkable food product of claim 1 further comprising a flavor.

7. The drinkable food product of claim 1 comprising from about 70% to about 95% total water, all by weight of the total drinkable food product.

8. The drinkable food product of claim 1 further comprising grain powder is selected from wheat, corn, rice, barley, millet, sorghum, rye, triticale, teff, wild rice, spelt, buckwheat, amaranth, quinoa, kaniwa, cockscomb, and combinations thereof.

9. The drinkable food product of claim 1 wherein the oat is whole oat.

10. A drinkable food product comprising milk and about 5 wt % to about 15 wt % hydrolyzed, spray-dried, agglomerated oat powder by weight of the total drinkable food product, wherein the agglomerated oat powder has an average particle size of 150 to 450 μm; wherein at least 70% of the particles are within the range of 150 to 450 μm.

11. The drinkable food product of claim 10 further comprising one or more of salt, hydrocolloids, polysaccharides, thickeners, artificial sweeteners, natural sweeteners, caffeine, dairy, coffee solids, tea solids, herbs, nutraceutical compounds, electrolytes, vitamins, minerals, amino acids, preservatives, alcohol, colorants, emulsifiers, and oils.

12. The drinkable food product of claim 10 further comprising grain powder is selected from wheat, corn, rice, barley, millet, sorghum, rye, triticale, teff, wild rice, spelt, buckwheat, amaranth, quinoa, kaniwa, cockscomb, and combinations thereof.

13. The drinkable food product of claim 10 wherein the oat is whole oat.

14. A drinkable oatmeal product comprising:
about 5 wt % to about 15 wt % hydrolyzed agglomerated oat flour by weight of the total drinkable food product, wherein the agglomerated oat powder has an average particle size of 150 to 450 μm; wherein at least 70% of the particles are within the range of 150 to 450 μm; water; and a fruit component selected from the group consisting of fruit juice, yogurt containing fruit, fruit puree, fresh fruit, dried fruit powder, fruit preserves and combinations thereof.

15. A method of improving dispersability of oat powder in a beverage, comprising the steps of mixing about 5 wt % to about 15 wt % hydrolyzed, spray-dried, agglomerated oat powder with a liquid, wherein the agglomerated oat powder has an average particle size of 150 to 450 μm; wherein at least 70% of the particles are within the range of 150 to 450 μm.

16. The method of claim 15 further comprising the step of adding one or more of beta glucan, salt, hydrocolloids, polysaccharides, thickeners, artificial sweeteners, natural sweeteners, caffeine, dairy, coffee solids, tea solids, herbs, nutraceutical compounds, electrolytes, vitamins, minerals, amino acids, preservatives, alcohol, colorants, emulsifiers, and oils to the beverage.

17. The method of claim 15 further comprising grain powder is selected from wheat, corn, rice, barley, millet, sorghum, rye, triticale, teff, wild rice, spelt, buckwheat, amaranth, quinoa, kaniwa, cockscomb, and combinations thereof.

18. The method of claim 15 wherein the oat is whole oat.

\* \* \* \* \*